Aug. 16, 1966      H. GRIFFON      3,266,558
APPARATUS FOR DEHYDRATION OF PASTY SUBSTANCES
Filed July 29, 1963      2 Sheets-Sheet 1
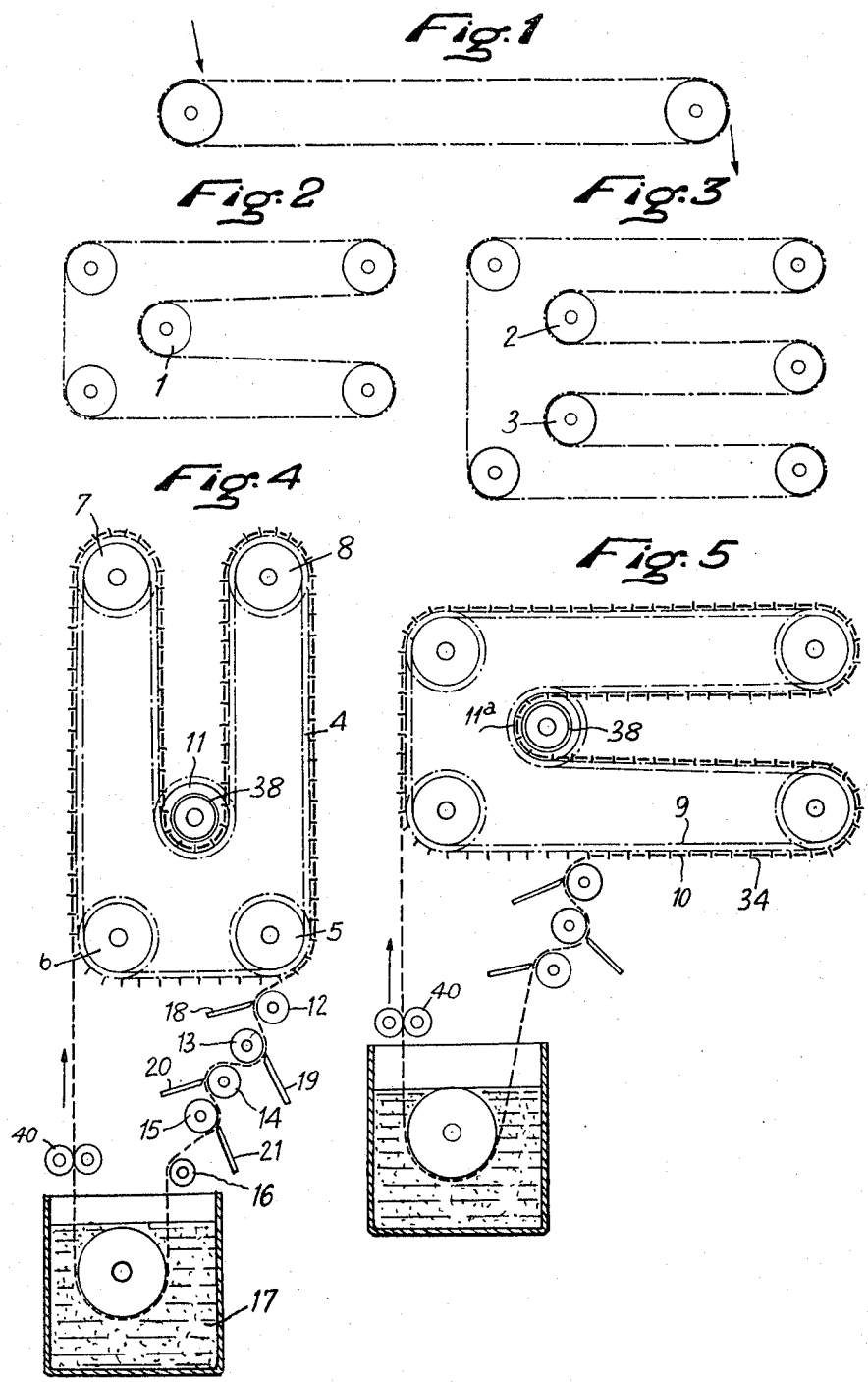

Aug. 16, 1966  H. GRIFFON  3,266,558
APPARATUS FOR DEHYDRATION OF PASTY SUBSTANCES
Filed July 29, 1963
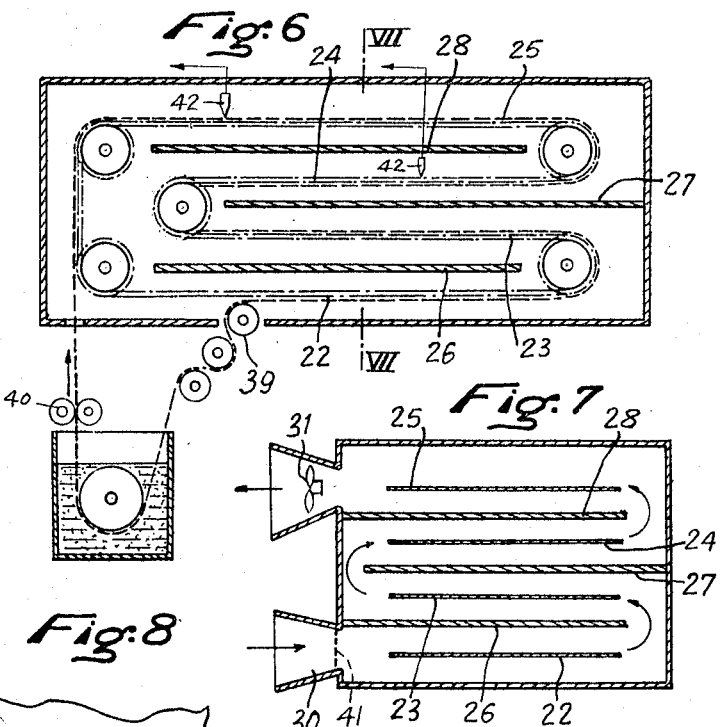
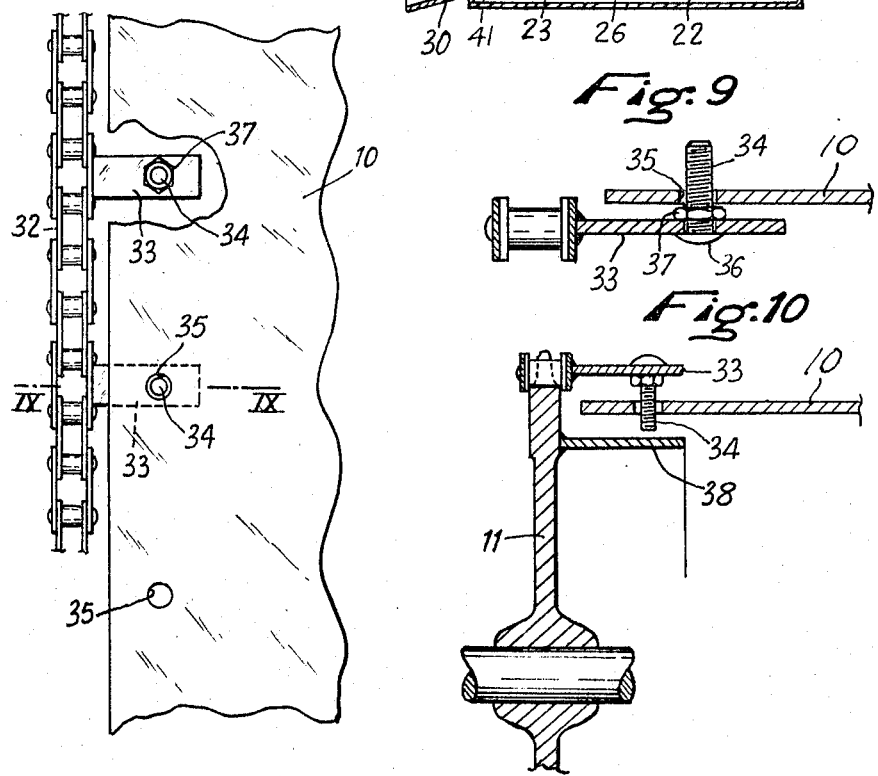

United States Patent Office 3,266,558
Patented August 16, 1966

3,266,558
APPARATUS FOR DEHYDRATION OF PASTY SUBSTANCES
Henri Griffon, 2 Place Mazas, Paris, France
Filed July 29, 1963, Ser. No. 298,074
Claims priority, application France, July 30, 1962, 905,493
5 Claims. (Cl. 159—44)

The present invention relates to an apparatus intended for the dehydration of pasty substances and it is particularly suitable for use in connection with the dehydration process described in French Patent No. 26,657 of February 26, 1963, a patent of addition to French Patent No. 1,323,626, issued March 4, 1963, in accordance with which there is initially prepared a suspension-emulsion of the substance to be dehydrated, which is intimately mixed with starch in order to produce a pasty mixture, which is spread out as a thin layer on plates or sheets made of an appropriate material, more especially of hydrophobic plastic material, the dehydration being obtained by the passage of a current of air or inert gas under the operational conditions at a temperature sufficiently low for the substance itself to be at a temperature not exceeding 37° C. throughout the entire process.

Nevertheless, this apparatus may also be suitable for the dehydration of all suspensions or even sufficiently thick solutions of substances of all compositions capable of being dehydrated by a gaseous current at low temperature when they are spread out in a thin layer on a substantially flat support.

The apparatus forming the subject of the present invention is characterised in that a chamber traversed by a gaseous current at low temperature has disposed therein a moving surface, formed by an endless travelling band, preferably of a water-repellent material, such as a plastic material or a metal lined with a film of plastic material, devices being provided for spreading the substance on one or both sides of the said band, either by immersion or by rolling, and the band being preferably driven by means of a change-speed gear which enables the speed of displacement of the travelling band to be varied as a function of the substance to be treated and the conditions under which the drying air circulates.

In particular, the apparatus may comprise the following arrangements, taken separately or in combination with one another:

(1) The gaseous drying atmosphere can be air or an inert gas or a mixture of air and inert gas, at ambient temperature or at a temperature sufficiently low for the substance not to reach a temperature higher than 37° C. throughout the entire duration of the process.

Nevertheless, it is to be noted that:

The evaporation of the water contained in the substance has the effect, particularly on commencing the process, when its water content is high, of lowering its actual temperature so that the temperature of the air can then be safely increased. Thus, in the initial part of the treatment, the air can reach temperatures up to 50° and even 55° C. without the temperature of the substance exceeding 37° C.

In particular, there will be provided thermoelectric probes 42 as shown in FIGURE 6 which detect the temperature of the substance at suitably chosen points and which automatically control the means for regulating the temperature and/or the hygrometric degree of the drying air, this giving complete safety as regards the danger of accidental overheating and making it possible to reduce to a minimum the period of operation without harming the quality of the product which is obtained.

(2) The travelling band is made of a water-repellent material, particularly of a plastic material so that the adherence of the initially spread pasty mixture decreases progressively during the dehydration and can reach a stage of being completely nullified when the dehydration is sufficient, this spontaneously producing the detachment or the separation of the layer of dehydrated substance from its support.

The water-repellent materials which are used are essentially formed by plastic materials of which the relative rigidity makes it possible to obtain sheets with a thickness of a few tenths of a millimetre, e.g. $\frac{4}{10}$ mm. to form the travelling band.

One material which has given good results is polyvinyl chloride. It is also possible to employ thin sheets of metal with a thickness of $\frac{1}{10}$ or $\frac{2}{10}$ mm. covered with a fluorinated or siliconised water-repellent plastic coating.

(3) The spreading devices vary according to the nature and the properties of the substance to be treated.

Provision has been made for the substance to be spread on both faces of the band, which thereby doubles the yield, by causing the band to travel through the substance and to be withdrawn vertically from the latter. It is appreciated that, under these conditions, the two faces of the band entrain identical layers of substance. This possibility is particularly applicable to substances which are relatively fluid and adherent to the support in the manner of a gum.

The most frequent cases are represented by pasty substances which are very fluid or of thick consistency. These latter substances can be spread on the band by rolling or by cylinders on a single face.

In certain preferred embodiments of the invention, the endless band enters a device for separating and collecting the dried substance by cutting and scraping and into an immersion spreading device, which are interposed on a loop of the band which is provided for this purpose outside the driving pinions of rollers.

(4) In one advantageous embodiment, the driving means comprises two chains for supporting the band consisting of plastic material or the like, which chains enclose the band and of which certain links, chosen at regular intervals, are provided with supporting fingers which are directed inwardly and at right-angles to the plane of the said chains, the said fingers themselves each being provided with a projection which extends through a corresponding hole of the band or the like.

(5) The apparatus is driven by means of an electric motor and a change-speed gear so that the operator is able to vary the speed of displacement and of the band according to the nature of the substance to be treated and the operational conditions, such as the speed, the hygrometric degree and the temperature of the gaseous fluid which is employed.

The invention is illustrated in the accompanying drawings by way of example and for facilitating the understanding of the description:

FIGURES 1 to 5 are very diagrammatic views showing how the endless band can be arranged.

FIGURE 6 is a vertical sectional view of an apparatus in accordance with the principles of the invention and FIGURE 7 is a diagrammatic view on the line VII—VII of FIGURE 6.

FIGURE 8 is a plan view, partly broken away and to a larger scale, showing a part of the driving chain with its band; and FIGURE 9 is the corresponding view in vertical section on the line IX—IX of FIGURE 8.

FIGURE 10 is a detail view showing a device for supporting the band at certain points of the circuit.

In its simplest form, the apparatus is represented by an endless band supported by conveyor chains which are for example rectilinear (FIG. 1).

The increase in output of such an arrangement is obtained by increasing the length and the width of the band. In actual fact, if it is considered that, for a given substance, the quantity of substance spread out per square decimetre is determined by the properties of the substance (for example 5 to 15 grams per decimetre) it is understood that by each dimension of the band being multiplied by two, the output will be multiplied by four.

In order to avoid having to make the apparatus too long, provision has been made for the band to follow a sinuous path by means of reversing pulleys.

FIGURE 2 illustrates the case of a reversal by means of a pulley 1, while FIGURE 3 illustrates the case of two reversals by means of two reversing pulleys 2 and 3.

The air or the inert gas is preferably caused to circulate in a dehydrating chamber in the apparatus in the form of a stream passing in a plane parallel to the surface to the belt and at right-angles to the unwinding direction or direction of travel of the band by being exhausted from inside by means of appropriate fans. The heating of this fluid is ensured by passing over heating elements such as, for example, electric resistances. The fluid is admitted, for example, at 35°, to the apparatus at the level of the band on which the substance carried on the band reaches the dehydration section in the chamber.

The substance is discharged at the end of the band in the simplest case, or at a suitable position, in the case where the band follows a sinuous path. This operation is effected by a fixed or rotatable scraper.

Experience has shown that the substances are classified in two types in this respect:

(a) those which are detached spontaneously on being separated from the support.

(b) those which are not detached spontaneously, but which can constitute a vitreous coating, such as coating being capable of becoming cracked and then detached from the support by causing the shape of the surface thereof to vary, for example, by suddenly changing it by bending. At this level, a scraper bar permits the substance to be collected.

If the band is coated with substance on both faces, it will be possible to change the surface thereof by successive bending operations in opposite directions.

In the embodiment which is shown diagrammatically in FIGURE 4, the substance is spread on the two faces of the band by immersion in a tank 17 and/or rollers 40 positioned adjacent opposite sides of the band; the endless band 4 passes over a driving system which is formed by driving pinions 5, 6, 7, 8, 11, one of which is driven by a motor and a variable speed gear (this motor and the change-speed gear, being conventional devices which have not been shown in the drawing), these various pinions being connected by two endless chains 9, which are placed on each side of the band 10, which is supported thereby because of the particular arrangement which will hereinafter be described. Between the pinions 5 and 6, the endless band 4 leaves the path of the driving chain 9; on leaving the pinions 5, it passes through a series of rollers 12, 13, 14, 15, 16, which cause bending effects in opposite directions of the surface of the band and consequently cracks and breaks in the two layers of dried substance which cover the said surfaces. Scraper devices, such as those formed by the blades 18, 19, 20, 21, detach the substance from the band and this substance can be collected by gravity in suitably disposed chutes (not shown in the drawing). The band when cleaned in this way then enters the tank 17 containing the substance which is to be dried, and is charged with this substance on both its surfaces by adhesion; the thickness of the layer is automatically regulated to a constant value, and this thickness can be controlled by the spread of the band, depending on the characteristics of the paste (consistency, adhesive character).

The modification which is illustrated in FIGURE 5 is of a similar type, but the general direction of the movement of the band is horizontal instead of being vertical.

Referring to FIGURES 6 and 7, it is seen how it is possible to introduce and guide the circulation air of gas or air heated by suitable means such as electrical heating element 41 and which enters through an orifice 30 passing parallel to the plane of the endless belt and at right angles to the direction of travel of the belt and leaves by way of a fan 31, so that all of the chamber 32 traversed by the substance undergoing the drying operation is under reduced pressure.

Baffle-like partitions 26, 27, and 28 are disposed between the various sections or runs 22, 23, 24 and 25 of the travelling band. The dry air is admitted from the side at the outlet end of the dry substance.

The driving of the travelling band can be effected by the following arrangement, which has the particular advantage of enabling this band to carry out a certain travel outside the drying chamber for the operations of collecting the dried substance and of recharging the band with fresh substance.

The driving pinions such as 5, 6, 7, 8 and 11, and the chain line shown in FIGURE 4, are formed in the manner of bicycle sprockets and chains. As can be seen from FIGURES 8 and 9, certain of the links 32 of the chain carry a finger or arm 33 which extends inwardly. These arms are for example disposed at a distance of about 5 cm. from one another; they thus serve as support for the travelling band, which is thus supported from two sides. The material and the thickness of the band are chosen so that this supporting effect at the two sides is sufficient for a good steady movement thereof, this being easily achieved because the band only has to support a very small load.

In order to improve the good steady movement and the driving of the band, the fingers or arms 33 can advantageously each comprise a projection which, in this embodiment, is formed by a pin or bolt 34, which extends into corresponding openings 35 punched at suitable positions in the margins of the band. It is advantageous if the bolt 34 has lateral walls which are roughened in order better to engage with the material forming the band. For this purpose, it is possible in very simple manner to employ screws 34 which are fixed by their head 36 and a nut 37 in a hole formed near the end of the finger or arm 33.

In the sections of its travel in which the band would be below the arms 33, for example during the passage over the reversing pinion 11a of FIGURE 5, it is possible, in order to avoid any detachment, to provide a circular supporting flange 38 which is fast with the pinion and on which the band is supported as it is passing over this pinion.

These arrangements make it possible for the band to be separated from its driving chains with the greatest ease, because of its own weight, when it passes beyond a last supporting roller 39 (FIG. 6), after which it enters the fragmentation devices (rollers 12, 13, 14, 15, 16) and collecting devices (scrapers 18, 19, 20, 21) (FIG. 4), in order then to descend into the tank of fresh substance 17 and to ascend, again charged with substance by adhesion, towards the pair of driving pinions 6, where it is taken up by the driving projections 35.

An apparatus constructed in this way is particularly suitable for obtaining, by dehydration, the drying of substances such as fruit or vegetable powders, and pharmaceutical or dietetic food products.

I claim:

1. Apparatus for the dehydration of pasty substances comprising: a closed chamber having disposed therein a driven endless band whose faces are formed of a water-repellant plastic material; means for driving said endless band; roller means adjacent the faces of said band for spreading thereon said substance to be dehydrated; means for heating a gas; gas moving means for circulating said gas in said chamber in a stream parallel to the planes of the band and at right angles to the direction of movement of said band; and temperature sensing probes for measuring the temperature of said substance on said band in said chamber to control said gas heating means to maintain said substance on said band at a selected temperature not exceeding 37° C.

2. Apparatus according to claim 1, in which said driving means comprises a parallel pair of chains driven by said rollers and positioned exteriorly proximate each edge of said band, each chain being provided with a multiplicity of inwardly projecting arms positioned interiorly proximate an edge of said band, each of said arms having a pin affixed by one end thereof to said arm at right angles thereto, which pin projects through a hole correspondingly positioned in said band proximate an edge thereof, thereby positively but disengageably engaging a segment of said band to said driving means.

3. Apparatus according to claim 1 in which the band is formed of polyvinyl chloride.

4. Apparatus as defined in claim 1 wherein said driving means for said endless band comprises: a plurality of rollers of which one is driven, said roller means for spreading said substance on said endless band interposed on a loop formed in a portion of said band externally of said chamber; means positioned adjacent the faces of said band externally of said chamber for successively bending said band in opposite directions for cracking said dehydrated substance on said band; and scraper means positioned adjacent said band and said bending means for scraping said dehydrated substance from said endless band.

5. Apparatus as defined in claim 1 wherein said driving means for said endless band comprises: a plurality of rollers, one of which is driven providing a convoluted path for said band; and a parallel pair of chains driven by said rollers and positioned proximate each edge of said band, said chain being provided with a multiplicity of inwardly projecting arms positioned interiorly proximate an edge of said band, each of said arms having a pin affixed by one end thereof to said arm at right angles thereto, each of said pins projecting through a hole correspondingly positioned in said band proximate an edge thereof thereby positively and detachably engaging said band to said driving means.

References Cited by the Examiner

UNITED STATES PATENTS

| | | | |
|---|---|---|---|
| 239,722 | 4/1881 | Cadwell | 159—7 X |
| 572,262 | 12/1896 | Kennel | 198—194 X |
| 744,823 | 11/1903 | Tucker et al. | 159—8 |
| 1,286,538 | 12/1918 | Coleman | 159—7 |
| 2,198,621 | 4/1940 | Izard | 18—15 |
| 2,265,313 | 12/1941 | Ridley | 34—158 |
| 2,288,571 | 6/1942 | Pointon | 198—193 |
| 2,574,083 | 11/1951 | Andrews | 34—158 |
| 2,852,811 | 9/1958 | Petriello | 18—15 |
| 2,858,237 | 10/1958 | Walles et al. | 198—193 X |
| 2,866,717 | 12/1958 | Bristol | 18—15 |
| 2,874,482 | 2/1959 | Haltmeier | 34—31 |
| 3,171,873 | 3/1965 | Fikentscher | 34—158 |

FOREIGN PATENTS 886,533  11/1960  Great Britain.

OTHER REFERENCES

Conveyor Belting in the Baking Industry pages 78 and 79 of Bakers Digest, October 1959, (volume XXXIII No. 5).

NORMAN YUDKOFF, *Primary Examiner.*

ROBERT L. PULFREY, *Examiner.*

J. SOFER, J. SHEA, *Assistant Examiners.*

UNITED STATES PATENT OFFICE
CERTIFICATE OF CORRECTION

Patent No. 3,266,558                                                    August 16, 1966

Henri Griffon

It is hereby certified that error appears in the above numbered patent requiring correction and that the said Letters Patent should read as corrected below.

Column 3, line 17, for "to the belt" read -- of the belt --; line 72, for "spread" read -- speed --; column 4, line 5, strike out "air".

Signed and sealed this 1st day of August 1967.

(SEAL)
Attest:

EDWARD M. FLETCHER, JR.                              EDWARD J. BRENNER
Attesting Officer                                                 Commissioner of Patents